(12) United States Patent
Li (10) Patent No.: US 10,048,766 B2
(45) Date of Patent: Aug. 14, 2018

(54) NON-CONTACT GESTURE BASED ELECTRONIC DEVICE

(71) Applicant: Huizhou TCL Mobile Communication Co., Ltd., Huizhou, Guangdong (CN)

(72) Inventor: Cansong Li, Guangdong (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 255 days.

(21) Appl. No.: 14/901,835

(22) PCT Filed: Jan. 20, 2015

(86) PCT No.: PCT/CN2015/071091
§ 371 (c)(1),
(2) Date: Dec. 29, 2015

(87) PCT Pub. No.: WO2016/070498
PCT Pub. Date: May 12, 2016

(65) Prior Publication Data
US 2016/0306430 A1    Oct. 20, 2016

(30) Foreign Application Priority Data
Nov. 7, 2014  (CN) .......................... 2014 1 0629253

(51) Int. Cl.
*G06F 3/01* (2006.01)
*G06F 3/03* (2006.01)
(Continued)

(52) U.S. Cl.
CPC ............ *G06F 3/017* (2013.01); *G06F 3/0304* (2013.01); *G06F 3/0421* (2013.01); *G06F 3/0485* (2013.01)

(58) Field of Classification Search
CPC ...... G06F 3/017; G06F 3/0304; G06F 3/0421; G06F 2203/04104; G06F 2203/04108;
(Continued)

(56) References Cited

U.S. PATENT DOCUMENTS 4,642,760 A  *  2/1987  Yanai ...................... G06F 13/24
                                                           700/12
5,374,894 A  *  12/1994  Fong ........................ G11C 7/22
                                                           327/1
(Continued)

FOREIGN PATENT DOCUMENTS

| CN | 102404437 A | 4/2012 |
| CN | 102520798 A | 6/2012 |
| EP | 2799955 A2 | 11/2014 |

OTHER PUBLICATIONS

Amin, Universal Gates, Sep. 2, 2013, CCSE.KFUPM.edu.sa.*

*Primary Examiner* — Patrick Edouard
*Assistant Examiner* — Douglas M Wilson
(74) *Attorney, Agent, or Firm* — Andrew C. Cheng (57) ABSTRACT

An electronic device controlled via a non-contact gesture is disclosed. The electronic device includes multiple infrared sensing units, when a gesture is passing over the infrared sensing units, status of level(s) outputted by output terminals of the infrared sensing units may be changed; a logic circuit, with its multiple input terminals being respectively connected to the output terminals of the multiple infrared sensing units, configured to, when there is a change in the levels outputted by the infrared sensing units, generate and output in interrupt signal; a processor, coupled respectively to the output terminals of the multiple infrared sensing units, and connected to the output terminal of the logic circuit, and configured to receive the interrupt signal and, when each time receiving the interrupt signal, acquire the level status at (Continued)

the output terminals of the infrared sensing units and save the level status as a set of level status data.

18 Claims, 4 Drawing Sheets

(51) Int. Cl.
*G06F 3/042* (2006.01)
*G06F 3/0485* (2013.01)

(58) Field of Classification Search
CPC ........ G06F 2203/04109; G06F 3/042–3/0436; G06F 1/3215; G06F 1/32; G06F 1/3231; G06F 11/30; G06F 3/0485
See application file for complete search history.

(56) References Cited

U.S. PATENT DOCUMENTS

| | | | |
|---|---|---|---|
| 2011/0198499 A1* | 8/2011 | Park | H01L 31/107 250/332 |
| 2011/0312349 A1 | 12/2011 | Babak et al. | |
| 2012/0110221 A1 | 5/2012 | Jeong et al. | |
| 2012/0146903 A1 | 6/2012 | Takeshi et al. | |
| 2014/0027606 A1* | 1/2014 | Raynor | G06F 3/0421 250/205 |
| 2014/0059365 A1* | 2/2014 | Heo | G06F 1/3206 713/320 |

\* cited by examiner

NON-CONTACT GESTURE BASED ELECTRONIC DEVICE

FIELD OF THE DISCLOSURE

The present disclosure relates to the field of electronic devices, and more particularly, to an electronic device that can be controlled via a non-contact gesture.

BACKGROUND OF THE DISCLOSURE

With the popularity of smart phones and the growing maturation of smart home concepts, users are having higher and higher requirements for user experience on smart devices. Thus, reducing or simplifying users' operating procedures so as to reduce the users' duration of contact with smart devices and to enable the users to manipulate some of the features without touching the device will be the development direction of smart technologies of the future.

Taking a current smart phone for example, one may need to press the power button when booting up the smart phone so as to light up the screen, and slide or by other means to unlock the screen. Also for example, one may need to activate the Bluetooth unit or WIFI unit for file sharing between smart phones, and manipulate the relevant files to choose the transmission mode. These operations, however, are all relatively complicated, causing inconvenience to the user.

Therefore, an electronic device that can be controlled via a non-contact gesture would be needed so as to solve the above problem.

SUMMARY OF THE DISCLOSURE

A primary technical issue to be addressed by the present disclosure is to provide an electronic device that can be controlled by a non-contact gesture, thus enabling the user with more efficient control of the electronic device and enhancing the user experience.

To address the above technical issue, one technical solution adopted by the present disclosure follows as below: to provide an electronic device that can be controlled via a non-contact gesture, the electronic device comprising: multiple infrared sensing units, wherein when there is a gesture passing through the infrared sensing units, status of levels outputted by output terminals of the infrared sensing units may be changed; a logic circuit, where multiple input terminals of the logic circuit are correspondingly connected to the output terminals of the multiple infrared sensing units, the logic circuit being configured to, when there is a change in the electric levels outputted by the infrared sensing units, generate and output an interrupt signal; a processor, coupled respectively with the output terminals of the multiple infrared sensing units, and connected to an output terminal of the logic circuit, and configured to receive the interrupt signal, acquire the level status at the output terminals of the multiple infrared sensing units and store the level status as a set of level status data, compare the level status data against preset data, proceed to receive the next interrupt signal when they are compared to be consistent, and, when having received a predetermined number of interrupt signals, determine that the gesture is recognized successfully and execute a corresponding command; wherein the logic circuit comprises an NAND gate circuit and multiple NOR gate circuits, the output terminal of each infrared sensing unit is connected to an input terminal of the NOR gate circuit, the output terminal of each NOR gate circuit is connected to the input terminal of the NAND gate circuit, the output terminal of the NAND gate circuit serves as the output terminal of the logic circuit; each infrared sensing unit comprises an infrared sensor and a signal conversion circuit connected to the infrared sensor, where the infrared sensor generates a pulse signal when a gesture is passing by the infrared sensor, and the signal conversion circuit is configured to convert the pulse signal generated by the corresponding infrared sensor to a high level signal.

Each of the NOR gate circuits may comprise four input terminals, the number of infrared sensing units is 14, the number of NOR gate circuits is 4, and the number of NAND gate circuit is 1. The input terminals of the NOR gate circuits that are not connected to the infrared sensing units are connected to Ground.

The infrared sensor may comprise an infrared receiving circuit and an infrared transmitting circuit. When the gesture is passing by the infrared sensor, the infrared light emitted by the infrared transmitting circuit is blocked and reflected to the infrared receiving circuit, and the infrared receiving circuit receives the reflected infrared light and generates the pulse signal.

The signal conversion circuit may be a monostable trigger circuit.

The electronic device may further comprise a pull-up resistor, and the output terminals of the infrared sensing units may be connected to a reference voltage via the pull-up resistor.

The display size of the electronic device may be 5 inches, and the infrared sensing units are disposed at the edge of both sides of the display, and 7 infrared sensing units are disposed on each side.

The processor may store a task flag bit, which may be incremented by 1 when the level status data is compared to be consistent with the preset data. When the task flag bit is incremented to a predetermined value, the gesture may be recognized successfully and a corresponding command may be executed.

The corresponding command may comprise an unlock command, a Bluetooth transmission command, a page-turning command or a phone-answering command.

To address the above technical issue, another technical solution adopted by the present disclosure follows as below: to provide an electronic device that can be controlled via a non-contact gesture, the electronic device comprising: multiple infrared sensing units, wherein when there is a gesture passing over the infrared sensing units, status of levels outputted by output terminals of the multiple infrared sensing units may be changed; a logic circuit, where multiple input terminals of the logic circuit are correspondingly connected to the output terminals of the multiple infrared sensing units, the logic circuit being configured to, when there is a change in the electric levels outputted by the infrared sensing units, generate and output an interrupt signal; a processor, coupled respectively to the output terminals of the multiple infrared sensing units, and connected to an output terminal of the logic circuit, and configured to receive the interrupt signal, acquire the level status at the output terminals of the multiple infrared sensing units and store the level status as a set of level status data, compare the level status data against preset data, proceed to receive the next interrupt signal when they are compared to be consistent, and, when having received a predetermined number of interrupt signals, determine that the gesture is recognized successfully and execute a corresponding command.

The logic circuit may comprise an NAND gate circuit and multiple NOR gate circuits. The output terminal of each infrared sensing unit may be connected to an input terminal of each NOR gate circuit. The output terminal of each NOR gate circuit may be connected to an input terminal of the NAND gate circuit, the output terminal of the NAND gate circuit serving as the output terminal of the logic circuit.

Each of the NOR gate circuits may comprise four input terminals, the number of infrared sensing units is 14, the number of NOR gate circuits is 4, and the number of NAND gate circuit is 1. The input terminals of the NOR gate circuits that are not connected to the infrared sensing units are connected to Ground.

Each infrared sensing unit may comprise an infrared sensor and a signal conversion circuit connected to the infrared sensor, where the infrared sensor may generate a pulse signal when a gesture is passing over the infrared sensor, and the signal conversion circuit is configured to convert the pulse signal generated by the corresponding infrared sensor to a high level signal.

The infrared sensor may comprise an infrared receiving circuit and an infrared transmitting circuit, wherein when the gesture is passing by the infrared sensor, the infrared light emitted by the infrared transmitting circuit is blocked and reflected to the infrared receiving circuit, and the infrared receiving circuit receives the reflected infrared light and generates the pulse signal.

The signal conversion circuit may be a monostable trigger circuit.

The electronic device may further comprise a pull-up resistor, and the output terminals of the infrared sensing units may be connected to a reference voltage via the pull-up resistor.

The display size of the electronic device is 5 inches, and the infrared sensing units are disposed at the edge of both sides of the display, 7 infrared sensing units are disposed on each side.

The processor may store a task flag bit, which may be incremented by 1 when the level status data is compared to be consistent with the preset data, and when the task flag bit is incremented to a predetermined value, the gesture may be recognized successfully and a corresponding command may be executed.

The corresponding command may be an unlock command, a Bluetooth transmission command, a page-turning command or a phone-answering command.

Beneficial effects of the present disclosure follows as below: in the present disclosure, differing from the prior art, multiple infrared sensing units are provided. When there is a gesture passing over the infrared sensing units, status of the levels outputted by output terminals of the infrared sensing units may be changed. Multiple input terminals of the logic circuit are correspondingly connected to the output terminals of the multiple infrared sensing units. The logic circuit may, when there is a change in the electric levels outputted by the infrared sensing units, generate and output an interrupt signal. The processor is coupled with the output terminals of the multiple infrared sensing units. The processor may receive the interrupt signal, and, when each time receiving the interrupt signal, acquire the level status at the output terminals of the multiple infrared sensing units and store the level status as a set of level status data, compare the level status data against the preset data, proceed to receive the next interrupt signal when they are compared to be consistent, and, when having received a predetermined number of interrupt signals, determine that the gesture is recognized successfully and execute a corresponding command, thus enabling the user to manipulate the electronic device more efficiently and thus enhancing the user experience.

DETAILED DESCRIPTION OF THE DISCLOSURE

Below a detailed description will be made on the present disclosure with reference to the attached drawings and embodiments.

Figure 1:
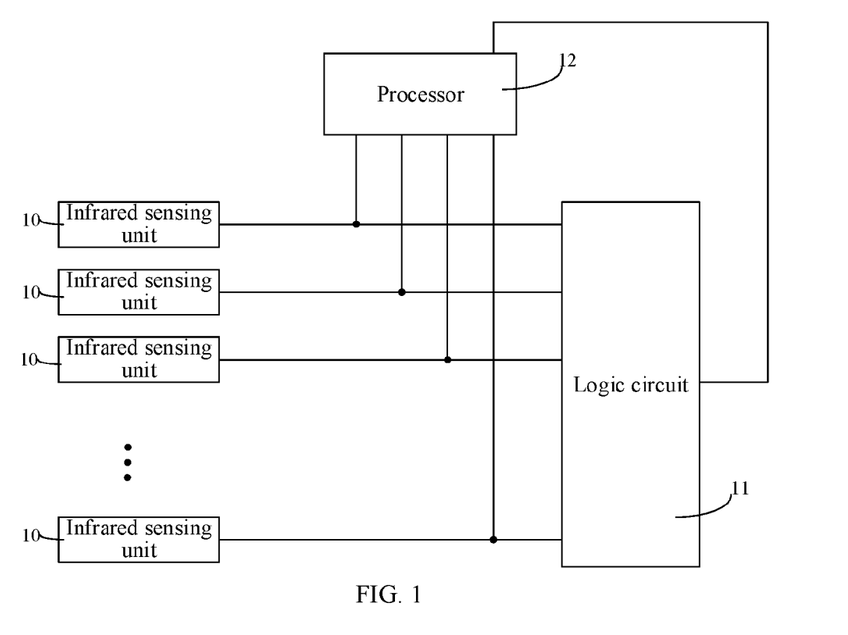
FIG. 1 is a block diagram illustrating an electronic device that can be controlled via a non-contact gesture according to a first embodiment of the present disclosure.

Referring now to FIG. 1, there is shown a block diagram illustrating an electronic device that can be controlled via a non-contact gesture according to a first embodiment of the present disclosure. In this embodiment, the electronic device comprises multiple infrared sensing units 10, a logic circuit 11 and a processor 12.

When there is a gesture passing over any one of the infrared sensing units 10, the status of level outputted by the output terminal of this infrared sensing unit 10 may be changed.

Multiple input terminals of the logic circuit 11 are respectively connected to the output terminals of the multiple infrared sensing units 10. The logic circuit 11 is configured to, when there is a change in the level(s) outputted by the infrared sensing units 10, generate and output an interrupt signal.

The processor 12 is coupled to the output terminals of the multiple infrared sensing units 10, and connected to the output terminal of the logic circuit 11. The processor 12 is configured to receive the interrupt signal generated by the logic circuit 11, and, when each time receiving the interrupt signal, acquire the level status at the output terminals of the multiple infrared sensing units 10 and store the level status as a set of level status data, and compare the level status data against preset data. When they are in accordance with each other, the processor 12 may proceed to receive the next interrupt signal, and, when having received a predetermined number of interrupt signals, determine that the gesture is recognized successfully and execute a corresponding command.

In one embodiment, the processor 12 may store a task flag bit, which may be incremented by 1 when the level status data is compared to be consistent with the preset data, and when the task flag bit is incremented to a predetermined value, the gesture may be recognized successfully and the corresponding command will be executed.

In one embodiment, the corresponding command may be an unlock command, a Bluetooth transmission command, a page-turning command or a phone-answering command.

Figure 2:
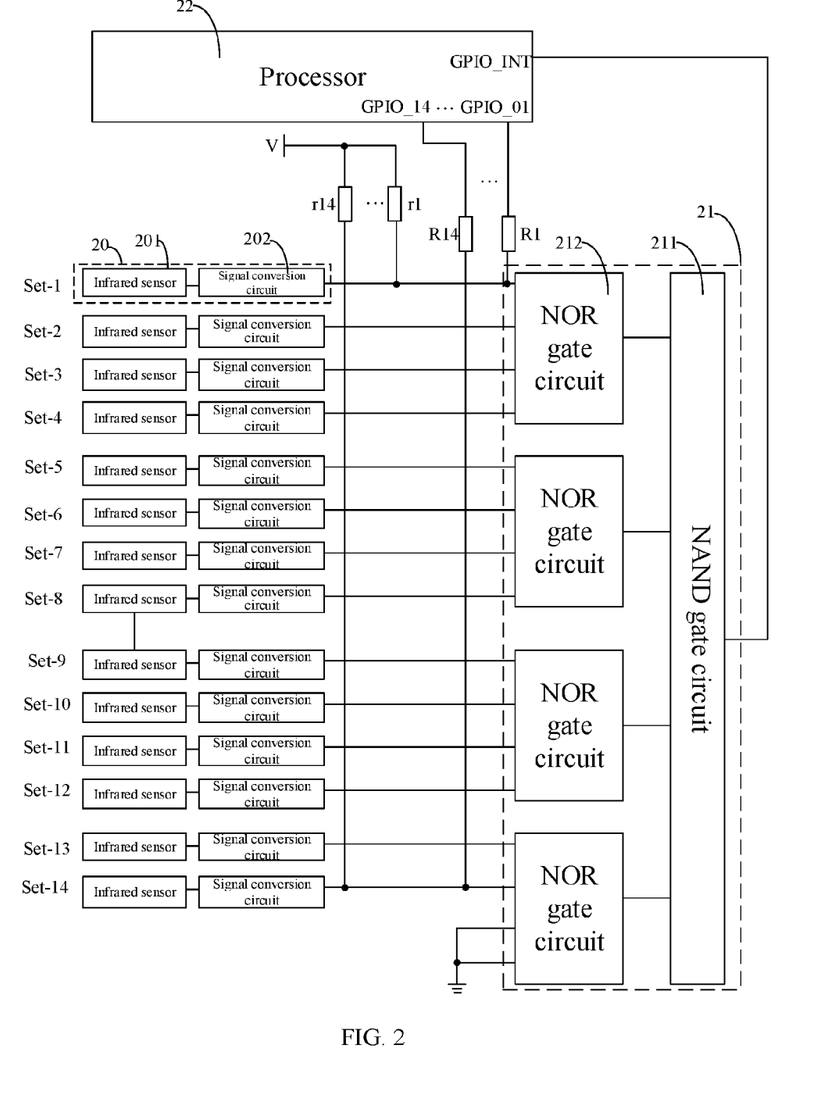
FIG. 2 is a block diagram illustrating an electronic device that can be controlled via a non-contact gesture according to a second embodiment of the present disclosure.

Referring now to FIG. 2, there is shown a block diagram illustrating an electronic device that can be controlled via a non-contact gesture according to a second embodiment of the present disclosure. In this embodiment, the electronic device comprises multiple infrared sensing units 20, a logic circuit 21 and a processor 22.

When there is a gesture passing over any one of the infrared sensing units 20, the status of level outputted by the output terminal of this infrared sensing unit 20 may be changed.

Multiple input terminals of the logic circuit 21 are respectively connected to the output terminals of the multiple infrared sensing units 20. The logic circuit 21 is configured to, when there is a change in the level(s) outputted by the infrared sensing units 20, generate and output an interrupt signal.

The processor 22 is coupled respectively to the output terminals of the multiple infrared sensing units 20, and connected to the output terminal of the logic circuit 21. The processor 22 is configured to receive the interrupt signal generated by the logic circuit 21, and, when each time receiving the interrupt signal, acquire the level status at the output terminals of the multiple infrared sensing units 20 and store the level status as a set of level status data, and compare the level status data against preset data. When they are in accordance with each other, the processor 22 may proceed to receive the next interrupt signal, and, when having received a predetermined number of interrupt signals, determine that the gesture is recognized successfully and execute a corresponding command.

In one embodiment, the processor 22 may store a task flag bit, which may be incremented by 1 when the level status data is compared to be consistent with the preset data, and when the task flag bit is incremented to a predetermined value, the gesture may be recognized successfully and a corresponding command will be executed.

In one embodiment, the logic circuit 21 may comprise an NAND gate circuit 211 and multiple NOR gate circuits 212. The output terminal of each infrared sensing unit 20 is connected to an input terminal of the NOR gate circuits 212, and the output terminal of each NOR gate circuit 212 is connected to the input terminal of the NAND gate circuit 211. The output terminal of the NAND gate circuit 211 serves as the output terminal of the logic circuit 21. In one embodiment, each NOR gate circuit 212 comprises four input terminals, the number of infrared sensing units 20 is 14, the number of NOR gate circuits 212 is 4, and the number of NAND gate circuit 211 is 1. The input terminals of the NOR gate circuits 212 that are not connected to the infrared sensing units 20 are connected to Ground.

In one embodiment, each infrared sensing unit 20 comprises an infrared sensor 201 and a signal conversion circuit 202 connected to the infrared sensor 201. The infrared sensor 201 may generate a pulse signal when a gesture is passing over the infrared sensor 201. The signal conversion circuit 202 is configured to convert the pulse signal generated by the corresponding infrared sensor 201 to a high level signal.

In one embodiment, the signal conversion circuit 202 may be a monostable trigger circuit 202.

In one embodiment, the electronic device may further comprise pull-up resistors r1~r14, and the output terminals of the infrared sensing units 20 may be connected to a reference voltage V via the pull-up resistors r1~r14. Though only resistors r1 and r14 are shown in FIG. 2, those of ordinary skill in the art can distinctly understand that connection relations of other pull-up resistors r2, r3, r4 . . . r13 are analogous to those of r1 and r14. Namely, the output terminal of the infrared sensing unit 20 of set-n is connected to the reference voltage V via resistor rn. Typically, the reference voltage V is 3 volts.

In one embodiment, the processor 12 may be coupled to the output terminals (i.e., the output terminals of the signal conversion circuits 202) of the multiple infrared sensing units 10 via the resistors R1~R14, respectively. Though only resistors R1 and R14 are shown in FIG. 2, those of ordinary skill in the art can distinctly understand that the connection relations of the other resistors R2, R3, R4 . . . R13 are analogous to those of the resistors R1 and R4. Namely, the output terminal of the infrared sensing unit 20 of set-n is connected to the GPIO pin, GPIO_0n, of the processor 12. For example, the output terminal of the infrared sensing unit 20 of set-7 is connected to GPIO_07 of the processor 12 via R7, and the other connection relations can be analogized accordingly.

In one embodiment, the output terminal of the logic circuit 21 may be connected to the GPIO interrupt pin of the processor 22, namely, to the GPIO_INT pin.

Figure 3:
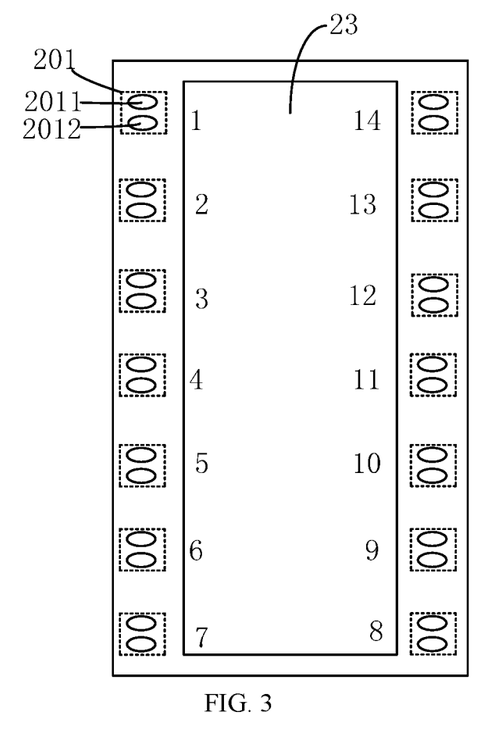
FIG. 3 is a diagram illustrating mounting positions of infrared sensors in an electronic device according to the present disclosure.

Referring to FIG. 3, there is shown a diagram illustrating the mounting positions of infrared sensors in an electronic device according to the present disclosure. In one embodiment, the infrared sensor 201 may comprise an infrared receiving circuit 2011 and an infrared transmitting circuit 2012. When a gesture is passing by the infrared sensor 201, the infrared light emitted by the infrared transmitting circuit 2012 may be blocked and reflected to the infrared receiving circuit 2011, and the infrared receiving circuit 2011 may generate a pulse signal when receiving the reflected infrared light.

In one embodiment, the size of display 23 of the electronic device is 5 inches, and the infrared sensing units 20 are disposed at the edge of both sides of the display 23, and 7 infrared sensing units are disposed on each side. For example, the infrared sensor 201 of the infrared sensing unit 20 can be disposed on the rim surface of the display 23 of the electronic device.

In one embodiment, the infrared transmitting circuit 2012 may comprise an astable oscillator and an infrared transmitting tube. The infrared receiving circuit 2011 may comprise an infrared receiving tube, a rectifier and filter circuit and two inverting amplifiers. The monostable trigger circuit is comprised of NE555 and peripheral devices including a resistor, a capacitor and an inductor. At present, at most four input terminals can be integrated into an existing NOR gate integrated circuit (IC). Thus, every four infrared sensing units 20 correspond to the output of one NOR gate circuit 212. It can be appreciated that, when science and technology are developed to the extent that more input terminals can be integrated into an NOR IC, then as fewer NOR circuits 212 as possible may be adopted to achieve the aforementioned effects.

In the case that none of the infrared sensors 201 are blocked (i.e., no gestures are passing over), no pulse signal will be outputted, and the monostable trigger circuits 202 will always output low levels, namely, at the four input terminals of each NOR gate circuit 212 are all low levels, then the output terminal of the NOR circuit 212 will output a high level. When one of the infrared sensors 201 is blocked, then the light reflected back will be absorbed and amplified by the corresponding infrared receiving circuit 2011, and a pulse signal will be outputted. The pulse signal may be converted by the monostable trigger circuit 202 to be a high level. Based on the logic relations of the NOR gate circuits 212, when any one input becoming a high level, then a low level will be outputted. A logic diagram of an NOR gate circuit 212 is illustrated in Table 1 as following.

TABLE 1

Logic Diagram of an NOR Gate Circuit

| Input terminal 1 | Input terminal 2 | Input terminal 3 | Input terminal 4 | Output terminal |
|---|---|---|---|---|
| 0 | 0 | 0 | 0 | 1 |
| 0 | 0 | 0 | 1 | 0 |
| 0 | 0 | 1 | 0 | 0 |
| 0 | 1 | 1 | 0 | 0 |
| 0 | 1 | 1 | 1 | 0 |
| ... | ... | ... | ... | ... |
| 1 | 1 | 1 | 1 | 0 |

It is worth noting that, in other embodiments, when the number of the infrared sensors 201 is different, the number of the NOR gate circuits 212 may also be different. In this embodiment, 4 NOR gate circuits 212 are needed, and the output terminals of the 4 NOR gate circuits 212 are connected to one NAND gate circuit 211. In the case that none of the infrared sensors 201 are blocked, the 4 NOR gate circuits will output a high level, and based on the logic relations of the NAND circuit 211, the output terminal of the NAND circuit 211 will output a low level. Once an infrared sensor 201 is triggered (i.e., blocked, or a gesture is passing over it), at least one output terminal of the 4 NOR gate circuits will jump from a high level to a low level. And the output terminal of the NAND gate circuit 211 will jump from a low level to a high level, thus triggering a hardware interrupt, and the output terminal (i.e., the output terminal of the logic circuit 21) of the NAND circuit 211 will generate an interrupt signal.

When the interrupt is awakened (i.e., the processor 22 receives the interrupt signal), the processor 22 may read immediately the level status of the 14 GPIO pins (GPIO pins refer to the general purpose input and output interfaces on the processor 22), namely, GPIO_01~GPIO_14, store the level status in the form of a set of level status data into buffer memory, and compare it against the data pre-set in the mobile phone. When they are compared to be identical, the processor 22 may proceed to receive the next interrupt response (receiving the interrupt signal), and successively records the GPIO level status after each interrupt response until that all 14 infrared sensors have triggered the interrupt. If any comparison result therein indicates that the data is not identical, the interrupt response will be immediately stopped, the user will be prompted with recognition-failure, and the program will be ended until the user begins the next gesture recognition.

Taking the electronic device as a mobile phone for example, theoretically, the interrupt response time of the mobile phone=hardware interrupt number×clock cycle. Since the mobile phone generally uses 32K crystal, thus in theory, the interrupt response time of the mobile phone=interrupt number×31 microseconds. The memory access speed is not only determined by its own operating frequency, but also affected by the access time and latency time of the column address strobe (CAS). However, considering that the nominal read speed of current memory is at nanosecond scale, therefore, it is fully capable of ensuring the data storage after each interrupt response.

The read speed of the GPIO pins of the processor 22 equals to one clock cycle in theory, while taking into account the system latency and the occupation of various processes, neither the read speed at the GPIO pins nor the interrupt response speed will achieve the theoretical value. However, from actual experimental results, current android systems and hardware environments can fully respond to the variation speed of the user's gesture. Specifically, according to our experimental statistics, the time for finishing a complete action variation is approximately between 0.02 S-0.05 S.

The user may, before using this function, pre-store 3 to 5 similar gestures, and the mobile phone may save the GPIO level data (level status data) generated during the gesture's changing process into the mobile_info partition, i.e., the GPIO level data is saved as the preset data. Each set's data structure is comprised of a 14×14 two-dimensional array [14][14], with the rows of the two-dimensional array being used to record the GPIO level status after each interrupt response, and the columns of the two-dimensional array being used to indicate the number of the interrupt responses. Thereafter, when the user uses the function to unlock or to perform wireless transmission, he/she may compare, in sequence, the acquired data against the data stored in the mobile-info partition. If the data are identical with each other, then the task flag bit will be incremented by 1, and when the task flag bit is incremented to be 14, the gesture will be recognized successfully and a corresponding command will be executed. The corresponding command may be an unlock command, a Bluetooth transmission command, a page-turning command or a phone-answering command.

The function according to the present disclosure can be activated or deactivated via phone settings. If the user turns on this function, then when the phone is in the unlock state (i.e., after the gesture is recognized successfully), the power switches in all hardware circuits according to the present solution will be in the close state by default. Only when the user turns on the Bluetooth function, may the software configure the GPIO to control the hardware power switches to be switched on. If the user turns off the Bluetooth function, the power switches will also be switched off, thus reducing the power consumption to the largest extent.

Referring now to FIG. 3, now considering the infrared sensors layout of the present embodiment. If the user's hand scans, in a conventional manner, from the lower left corner to the upper right corner, then the infrared sensor first triggered will be the infrared sensor of set-7. The values of the GPIO pins will be read immediately after the interrupt response. And, based on the GPIO's high and low levels, it can be determined that which set of infrared sensor is triggered. Considering that two or more infrared sensors may be triggered simultaneously, the processor may not determine which one is triggered, but record the status of all the infrared sensors at the moment of the interrupt being triggered, and save the status to a 14×14 two-dimensional array. Therefore, by comparing the data of the arrays, it can be accurately determined that whether the variation of the gesture is identical with the preset data.

Figure 4:
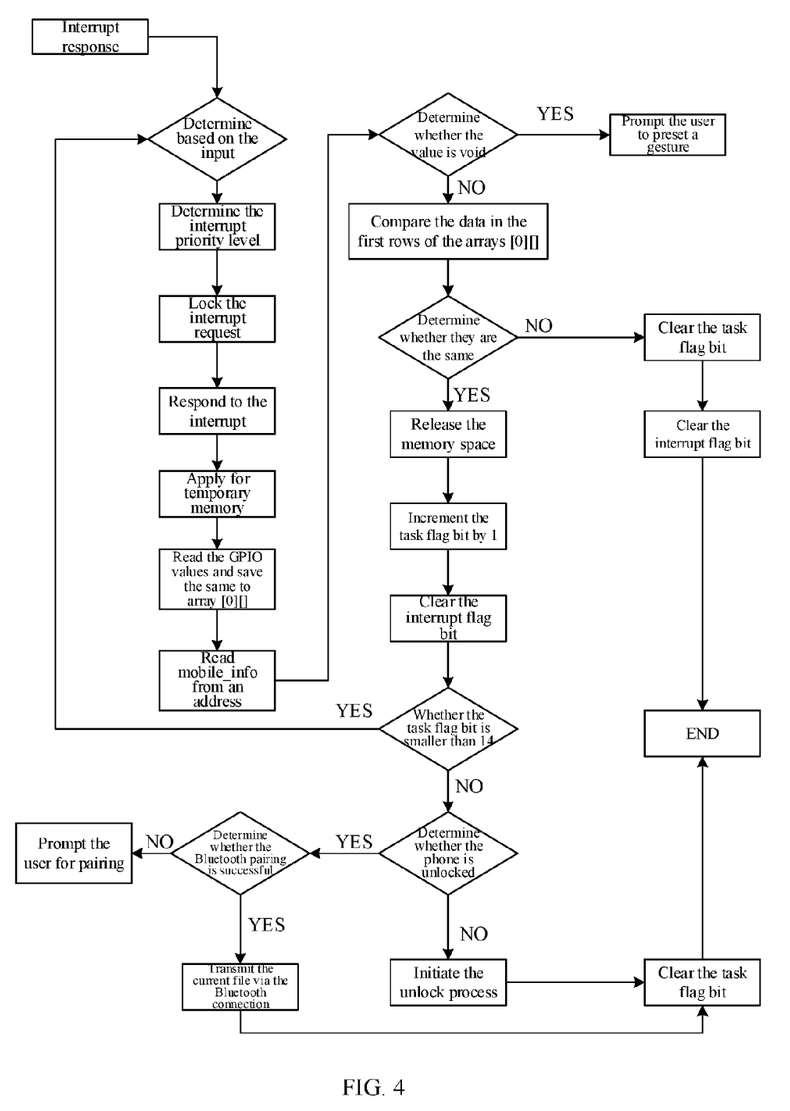
FIG. 4 is a flow chart illustrating a specific application example of the electronic device according to the second embodiment of the present disclosure.

Referring now to FIG. 4, there is shown a flow chart illustrating a specific application example of the electronic device according to the second embodiment of the present disclosure. In this embodiment, the application of the electronic device according to the present embodiment will be described by taking smart-unlock and Bluetooth transmission with a mobile phone for example. The output terminal of the logic circuit sends out an interrupt response (i.e., an interrupt signal). The processor determines whether the task flag bit is greater than 14 or not, if so, the processor begins to determine the interrupt priority level, lock the interrupt request, respond to the interrupt, apply for temporary memory, and read the GPIO values (i.e., acquire the level status at the output terminals of the multiple infrared sensing units 20 and save the level status as a set of level status data) and save the same to into array [0][ ]. The processor may then start reading mobile_info from an address (namely, reading the preset data saved in the mobile_info), and determine whether it is void (namely, determine whether the preset data to be read is void). If so, the processor may prompt the user to set up a preset switch gesture (i.e., the pre-stored 3 to 5 similar gesture variations described afore). If it is not void, the processor may compare the data in the first row of the array [0][ ] containing the read GPIO values against the data in the first row of the array [0][ ] containing the preset data, and determine whether they are the same. If not, the processor may clear the task flag bit and the interrupt flag bit, and end with the gesture recognition-failure. If so, the process may release the memory space, increment the task flag bit by 1 and then clear the interrupt flag bit, and, when the task flag bit is greater than 14, determine whether the phone is unlocked. If so, the processor may determine whether the Bluetooth pairing is successful. If it is not successful, the processor may prompt then user for Bluetooth pairing. If it is successful, the processor may transmit the current file via the Bluetooth connection (namely, execute the Bluetooth transmission command as described above), and then clear the task flag bit to end. If the phone is not unlocked, then the processor may initiate the unlock process (namely, execute the unlock command as described afore), and then clear the task flag bit to end.

The above description is illustrated by taking the case where the electronic device is a cell phone and a Bluetooth transmission command or an unlock command is executed after the gesture is recognized successfully as an example, but the present disclosure is not merely limited thereto. Generally, the electronic device according to the present disclosure can also comprise other functions such as, for example, to intelligently read an electronic book, to intelligently answer a phone call, and so on. Furthermore, the function according to present disclosure can also be applied on a smart television, including browse function, boot-up function, and so on. The present disclosure uses fewer components to achieve non-contact gesture manipulation, and determines the number and spacing of the infrared sensors based on the display size of the electronic device such as a cell phone, thus achieving far better gesture detection effects.

Differing from the prior art, in the present disclosure, multiple infrared sensing units are provided. When there is a gesture passing through the infrared sensing units, status of the level(s) outputted by the output terminals of the infrared sensing units may be changed. Multiple input terminals of the logic circuit are correspondingly connected to the output terminals of the multiple infrared sensing units. When there is a change in the electric levels outputted by the infrared sensing units, the logic circuit may generate and output an interrupt signal. The processor is coupled with the output terminals of the multiple infrared sensing units, and may receive the interrupt signal, and, when each time receiving the interrupt signal, acquire the level status at the output terminals of the multiple infrared sensing units, store the level status as a set of level status data, compare the level status data against the preset data, proceed to receive the next interrupt signal when they are compared to be consistent, and, when having received a predetermined number of interrupt signals, determine that the gesture is recognized successfully and execute a corresponding command, thus enabling the user to manipulate the electronic device more efficiently and thus enhancing the user experience.

What is described above is merely embodiments of the present disclosure, thus shouldn't be construed to be limiting the patentable scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. An electronic device capable of being controlled by a non-contact gesture, comprising:

a plurality of infrared sensing units each comprising one output terminal, wherein when there is a gesture passing over the plurality of infrared sensing units, status of levels outputted by output terminals of the plurality of infrared sensing units are changed;

a logic circuit, wherein a plurality of input terminals of the logic circuit are respectively connected to the output terminals of the plurality of infrared sensing units, and the logic circuit is configured to, when there is a change in the levels outputted by the infrared sensing units, generate an interrupt signal and output the interrupt signal;

a processor, coupled respectively to the output terminals of the plurality of infrared sensing units, and connected to an output terminal of the logic circuit, the processor being configured to receive the interrupt signal, and, when each time receiving the interrupt signal, acquire level status at the output terminals of the plurality of infrared sensing units and save the level status as a set of level status data, compare the level status data against preset data, proceed to receive a next interrupt signal when they are compared to be consistent, and, when having received a predetermined number of the interrupt signals, determine that the gesture is recognized successfully and execute a corresponding command;

wherein the logic circuit comprises an NAND gate circuit and a plurality of NOR gate circuits, each of the NOR gate circuits comprising a plurality of input terminals, the output terminal of each infrared sensing unit being connected to one of the input terminals of one of the NOR gate circuits, different output terminals being connected to different input terminals of the NOR gate circuits, an output terminal of each NOR gate circuit being connected to an input terminal of the NAND gate circuit, and an output terminal of the NAND gate circuit serving as the output terminal of the logic circuit; each infrared sensing unit comprises an infrared sensor and a signal conversion circuit connected to the infrared sensing unit, the infrared sensor generates a pulse signal when there is a gesture passing over the infrared sensors, and the signal conversion circuit is configured to convert the pulse signal generated by the corresponding infrared sensor into a high level signal;

wherein the processor stores a task flag bit, the task flag bit is incremented by 1 when the level status data is compared to be consistent with the preset data, and when the task flag bit is incremented to a predetermined value, the gesture is recognized successfully and the corresponding command is executed.

2. The electronic device according to claim 1, wherein each NOR gate circuit comprises four input terminals, the number of the infrared sensing units is 14, the number of the NOR gate circuits is 4, the number of the NAND gate circuit is 1, and the input terminals of the NOR gate circuits that are not connected to the infrared sensing units are connected to Ground.

3. The electronic device according to claim 2, wherein the infrared sensing units are disposed at the edge of both sides of a display, and 7 of the infrared sensing units are disposed on each side.

4. The electronic device according to claim 1, wherein each infrared sensor comprises an infrared receiving circuit and an infrared transmitting circuit, and when there is a gesture passing over the infrared sensor, infrared light emitted by the infrared transmitting circuit is blocked and reflected to the infrared receiving circuit, and the infrared receiving circuit receives the reflected infrared light and generates the pulse signal.

5. The electronic device according to claim 1, wherein the signal conversion circuit is a monostable trigger circuit.

6. The electronic device according to claim 1, further comprising a pull-up resistor, wherein the output terminal of each of the infrared sensing units is connected to a reference voltage via the pull-up resistor.

7. The electronic device according to claim 6, wherein the reference voltage is 3 volts.

8. The electronic device according to claim 1, wherein the corresponding command comprises an unlock command, a Bluetooth transmission command, a page-turning command or a phone-answering command.

9. An electronic device capable of being controlled by a non-contact gesture, comprising:
a plurality of infrared sensing units each comprising one output terminal, wherein when there is a gesture passing over the plurality of infrared sensing units, status of level(s) outputted by output terminals of the plurality of infrared sensing units is/are changed;
a logic circuit, wherein a plurality of input terminals of the logic circuit are respectively connected to the output terminals of the plurality of infrared sensing units, and the logic circuit is configured to, when there is a change in the levels outputted by the plurality of infrared sensing units, generate an interrupt signal and output the interrupt signal;
a processor, coupled respectively to the output terminals of the plurality of infrared sensing units, and connected to an output terminal of the logic circuit, the processor being configured to receive the interrupt signal, and, when each time receiving the interrupt signal, acquire level status at the output terminals of the plurality of infrared sensing units and save the level status as a set of level status data, compare the level status data against preset data, proceed to receive a next interrupt signal when they are compared to be consistent, and, when having received a predetermined number of the interrupt signals, determine that the gesture is recognized successfully and execute a corresponding command;
wherein the processor stores a task flag bit, which is incremented by 1 when the level status data is compared to be consistent with the preset data, and when the task flag bit is incremented to a predetermined value, the gesture is recognized successfully and the corresponding command is executed.

10. The electronic device according to claim 9, wherein the logic circuit comprises an NAND gate circuit and a plurality of NOR gate circuits, each of the NOR gate circuits comprises a plurality of input terminals, the output terminal of each infrared sensing unit being connected to one of the input terminals of one of the NOR gate-circuits, different output terminals being connected to different input terminals of the NOR gate circuits, an output terminal of each NOR gate circuit is connected to an input terminal of the NAND circuit, and an output terminal of the NAND circuit serves as the output terminal of the logic circuit.

11. The electronic device according to claim 10, wherein each NOR gate circuit comprises four input terminals, the number of the infrared sensing units is 14, the number of the NOR gate circuits is 4, the number of the NAND gate circuit is 1, and the input terminals of the NOR gate circuits that are not connected to the infrared sensing units are connected to Ground.

12. The electronic device according to claim 11, wherein the infrared sensing units are disposed at the edge of both sides of a display, and 7 of the infrared sensing units are disposed on each side.

13. The electronic device according to claim 9, wherein each infrared sensing unit comprises an infrared sensor and a signal conversion circuit connected to the infrared sensor, the infrared sensor generates a pulse signal when a gesture is passing over the infrared sensor, and the signal conversion circuit is configured to convert the pulse signal generated by the corresponding infrared sensor to a high level signal.

14. The electronic device according to claim 13, wherein the infrared sensor comprises an infrared receiving circuit and an infrared transmitting circuit, when there is a gesture passing over the infrared sensor, infrared light emitted by the infrared transmitting circuit is blocked and reflected to the infrared receiving circuit, and the infrared receiving circuit receives the reflected infrared light and generates the pulse signal.

15. The electronic device according to claim 13, wherein the signal conversion circuit is a monostable trigger circuit.

16. The electronic device according to claim 9, further comprising a pull-up resistor, wherein the output terminal of each of the infrared sensing units is connected to a reference voltage via the pull-up resistor.

17. The electronic device according to claim 16, wherein the reference voltage is 3 volts.

18. The electronic device according to claim 9, wherein the corresponding command comprises an unlock command, a Bluetooth transmission command, a page-turning command or a phone-answering command.

* * * * *